(12) United States Patent
Wedemann

(10) Patent No.: US 11,724,767 B2
(45) Date of Patent: Aug. 15, 2023

(54) QUICKLY DETACHABLE AND ROTATABLE BICYCLE HANDLEBAR STEM

(71) Applicant: Horst Wedemann, Hamburg (DE)

(72) Inventor: Horst Wedemann, Hamburg (DE)

( * ) Notice: Subject to any disclaimer, the term of this patent is extended or adjusted under 35 U.S.C. 154(b) by 30 days.

(21) Appl. No.: 17/325,344

(22) Filed: May 20, 2021

(65) Prior Publication Data

US 2021/0362799 A1 Nov. 25, 2021

(30) Foreign Application Priority Data

May 20, 2020 (EP) ..................................... 20175864

(51) Int. Cl.
*B62K 21/12* (2006.01)
*B62K 21/22* (2006.01)

(52) U.S. Cl.
CPC .............. *B62K 21/22* (2013.01); *B62K 21/12* (2013.01)

(58) Field of Classification Search
CPC ........ B62K 21/12; B62K 21/18; B62K 21/22; B62K 21/24
See application file for complete search history.

(56) References Cited

U.S. PATENT DOCUMENTS

| | | | |
|---|---|---|---|
| 6,167,780 B1 * | 1/2001 | Chen ..................... | B62K 21/06 74/551.8 |
| 6,186,027 B1 * | 2/2001 | Nielsen .................. | B62K 21/18 403/365 |
| 11,459,056 B2 * | 10/2022 | Beistegui Chirapozu ................... | B62K 21/16 |
| 2005/0206120 A1 * | 9/2005 | Liao ...................... | B62K 21/22 280/281.1 |
| 2006/0096408 A1 * | 5/2006 | Liao ...................... | B62K 21/16 74/551.1 |
| 2006/0177260 A1 * | 8/2006 | Liao ...................... | B62K 21/22 403/109.1 |

(Continued)

FOREIGN PATENT DOCUMENTS

| | | |
|---|---|---|
| CN | 101987647 | 3/2011 |
| CN | 202541746 | 11/2012 |
| DE | 9116836 U1 * | 7/1994 |

(Continued)

OTHER PUBLICATIONS

Machine translation of CN 202541746 U obtained on Aug. 15, 2022.*

*Primary Examiner* — Adam D Rogers
(74) *Attorney, Agent, or Firm* — Sand, Sebolt & Wernow Co., LPA

(57) ABSTRACT

The invention relates to a handlebar stem, which permits simple and quick loosening and twisting, as well as simple and safe resetting and fastening of said stem with the handlebar attached thereto. The problem of the invention is to provide a particularly simple, theft-proof and versatile alternative involving low manufacturing costs, and which can also easily be retrofitted. A stem set according to the invention comprises a stem and at least one locking device, which can be fixedly clamped to the steerer tube. According to the invention, the stem set is arranged, such that when mounted on the steerer tube, the locking device fixedly connected to the steerer tube prevents the stem from being pulled off the steerer tube. However, this can also be achieved, for example, by the stem engaging around and/or behind the locking device and/or the locking device engaging around and/or behind the stem.

22 Claims, 3 Drawing Sheets

(56) References Cited

U.S. PATENT DOCUMENTS

2021/0300501 A1\*  9/2021  Beistegui Chirapozu ................... B62K 21/06

FOREIGN PATENT DOCUMENTS

| DE | 19905130 A1 | \* | 8/2000 | ............. B62K 21/16 |
| --- | --- | --- | --- | --- |
| DE | 20104516 U1 | \* | 5/2001 | ............. B62K 21/06 |
| TW | M535190 U | \* | 1/2017 | |

\* cited by examiner

QUICKLY DETACHABLE AND ROTATABLE BICYCLE HANDLEBAR STEM

TECHNICAL FIELD

The invention relates to a handlebar stem which enables simple and quick loosening and twisting, as well as simple and safe resetting and fastening of said stem with the handlebar attached thereto. This allows for space-saving storage, e.g., of a bicycle.

BACKGROUND

Background Information

Numerous solutions of this kind are known from the prior art. However, they all require an extensive configure effort, especially when retrofitting, or are complicated, expensive or unsafe, or particularly vulnerable to theft.

Such a solution is known, e.g., from US 2006/0096408 A1. However, this solution is particularly vulnerable to theft and requires several manipulations in order to twist and reset. A special steering shaft is also required, which makes retrofitting costly and material-intensive. Moreover, it cannot be used with steering shafts firmly connected to the fork.

CN 202541746 U discloses a stem with a toggle clamp and a top and bottom clamping collar. CN 101987647 B discloses a steerer tube with a spring-loaded locking lug in order to prevent a stem from being unintentionally pulled off.

SUMMARY

The problem of the invention is to provide a particularly simple, theft-proof, and versatile alternative involving low manufacturing costs, and which can be easily retrofitted.

This problem is solved by a stem set and a vehicle that includes the stem set. In accordance with an aspect of the invention the stem set is for a bicycle with, in particular, a single one-piece, round steerer tube. The stem set has a stem, wherein the stem has at least one releasable clamping clip for enclosing the round steerer tube and at least one clamping means for reversible and releasable clamping of the at least one clamping clip on the steerer tube. The at least one clamping clip is arranged such that, in a position in which the at least one clamping clip is clamped on the steerer tube by the at least one clamping means, rotation of the stem about the steerer tube is prevented and, in a released position, rotation of the stem about the steerer tube is not prevented. The stem set is characterized in that the at least one clamping means has a hand-grip section for manual movement, wherein the movement of the hand-grip section in a first direction or in a direction of rotation causes reversible clamping of the at least one clamping clip on the steerer tube by means of the clamping means, and wherein the movement of the hand-grip section in a second direction, in particular, opposite the first direction, or in a direction of rotation, causes reversible clamping release of the at least one clamping clip on the steerer tube, and/or is configured such that by means of the at least one clamping means, in particular a human hand, in particular without the use of tools, the at least one clamping clip can be switched from the clamped to the released position and from the released to the clamped position, in particular the clamping means is a toggle clamp, a wing nut, wing screw, knurled screw and/or tommy screw, and in that the stem set has at least one locking device (also referred to herein as a locking mechanism), which can be fixedly connected, in particular clamped, to the steerer tube, wherein the locking device prevents the stem from being pulled off the steerer tube by limiting the movement of the stem along the steerer tube, wherein the locking device has at least one locking device preventing pull-off, which engages behind the stem, and/or the stem has at least one securing element, which engages behind the locking device in order to prevent pull-off.

Advantageous developments that may also be implemented in the vehicle include that the locking device and/or the stem may have at least one first projection, and/or at least one first recess for limiting the rotation of the stem on the steerer tube relative to the locking device, when the stem set is mounted on the steerer tube, wherein, in particular, the at least one first recess and/or the at least one first projection is and/or are formed and/or arranged, such that the limitation, when being struck, defines a predetermined rotational position of the stem relative to the locking device, wherein the at least one first projection and/or the at least one first recess in the released position of the clamping clip limits the rotation of the stem about the steerer tube to an angle of rotation of less than 360°. The stem set may be adapted, when mounted on the steerer tube in the released position of the clamping clip, to allow for rotation of the stem about the steerer tube relative to the locking device in a first direction of rotation into the rotational position of the stem relative to the locking device predetermined by the limitation, but prevent it in a second direction of rotation opposite the first direction of rotation, in particular in such a way that this is not possible without dismantling the stem set. The at least one first recess and/or the at least one first projection, when the stem set is mounted on the steerer tube in the released position of the clamp, may allow for rotation of the stem about the steerer tube relative to the locking device of at least 10°, and limits rotation of the stem about the steerer tube relative to the locking device to less than 360°, such that rotation by 360° is feasible only upon dismantling the stem set. The stem set may further comprise at least one locking member on the stem and/or on the locking device, wherein the locking member has a return member, the return member being arranged to pretension the locking member in a first position and allow movement of the locking member into a second position against a force exerted by the return member, wherein the stem set may be arranged such that, in the released position of the at least one clamping clip, the locking element in the first position does not restrict rotation of the stem, when the stem set is mounted on the steerer tube relative to the locking device in a first direction of rotation, in particular when moving the locking element into the second position due to the parts of stem and locking device rotating relative to one another, but restricts it in a second direction of rotation opposite the first direction of rotation, in particular fully prevents it in the predetermined rotational position together with the at least one first recess and/or the at least one first projection, however, allows it after manually moving the locking element into the second position.

Furthermore, in the clamped position of the at least one clamping clip, the at least clamping means may prevent rotation of the stem about the steerer tube up to a torque of 150 Nm being applied to the stem and/or wherein, in the clamped position of the at least one clamping clip, the stem may be non-positively connected to the steerer tube, wherein the required torque for rotating the stem around the steerer tube is at least 150 Nm. The locking device may be adapted to enclose the steerer tube and/or has a tensioning screw, in particular a direct or indirect tensioning screw, wherein the locking device is adapted to be clamped on the steerer tube by means of the tensioning screw, such that rotation about and translation along the steerer tube is prevented, at least at a torque of less than 150 Nm and/or a translational force of less than 250 N. The locking device may be adapted to be arranged on the steerer tube directly below the stem, in particular between the stem and an upper bearing cone, or adapted to be arranged on the steerer tube above the stem, in particular between the stem and a first end of the steerer tube, wherein the first end is opposite a second end closest to a blade of the fork.

A stem set according to the invention for a vehicle, in particular, with a single one-piece, round steerer tube, in particular for a bicycle, has a stem and at least one, in particular exactly one, locking mechanism, which can be rigidly mounted on the steerer tube, in particular clamped.

In this case, the stem has at least one releasable clamping clip in order to enclose the round steerer tube and at least one clamping means for reversible, releasable clamping of the at least one clamping clip on the steerer tube. Thus, the at least one clamping clip is configured to prevent rotation of the stem about the steerer tube in a position clamped on the steerer tube by the at least one clamping means and not prevent rotation of the stem about the steerer tube in a released position. Preventing rotation means, in particular, preventing rotation up to a torque of at least 150 Nm, in particular at least 250 Nm. Not preventing means in particular that a rotation requires a maximum 10 Nm, in particular a maximum torque of 4 Nm.

Furthermore, the at least one clamping means has a hand-grip section for moving, in particular directly, by means of a hand, wherein the movement of the hand-grip section in a first direction or in a rotational direction causes reversible clamping of the at least one clamping clip on the steerer tube by means of the clamping means, and wherein the movement of the hand-grip section in a second direction in particular opposite the first direction, or in a rotational direction, causes reversible release of the clamping of the at least one clamping clip on the steerer tube, and/or the stem is configured such that the at least one clamping means, in particular a human hand, may transfer the at least one clamping clip from the clamped to the released position and from the released to the clamped position without the use of tools. In particular, the movement of the clamping means in a first or a rotational direction causes reversible clamping of the at least one clamping clip on the steerer tube by means of the clamping means, and the movement of the clamping means in a second direction or rotational direction, in particular opposite the first direction, causes reversible release of the clamping of the at least one clamping clip on the steerer tube.

Preferably, the clamping means is a toggle clamp, a wing nut, wing screw, thumbscrew and/or tommy screw, a screw, an Allen screw with pin, or a Torx screw with a pin. The screw, the Allen or Torx screw is in particular arranged, and/or the stem is in particular configured, such that the screw and/or its screw head is countersunk in the stem in the clamped position. This further reduces the risk of theft and sabotage. In contrast, a toggle clamp, a wing nut, a wing screw, a thumbscrew, and/or a tommy screw allow for tool-less use.

In particular, the transition between clamped and released position requires a torque of less than 10 Nm and/or a force of less than 50 N.

In particular, the stem is adapted to fit around the steerer tube, in particular in an annular fashion, and/or be clamped onto the steerer tube from the outside.

According to the invention, the stem set is arranged such that when mounted on the steerer tube, the locking mechanism, which is fixedly connected to the steerer tube, prevents the stem from being pulled off the steerer tube at least in the released position, but in particular also in the clamped position of the at least one clamping clip.

When mounted, this means, in particular, that the locking mechanism is clamped on a steerer tube, in particular enclosing the steerer tube and/or from the outside, and the stem is arranged on the same steerer tube, in particular, enclosing the steerer tube, in particular directly adjacent to, in particular, above or below the locking mechanism, in particular, such that the locking mechanism and stem engage in one another and/or partially enclose one another, and/or are positively connected and/or coupled to one another. In particular, a handlebar is also mounted on the stem.

In particular, the steerer tube is a round tube or a round rod having an outer diameter in the 2-5 cm range, particularly in the 22-29 mm range, and particularly from 21, 22, 25, 25, 28, 32, 35, or 38 mm.

In particular, the locking mechanism prevents pulling away, in particular toward the free end of the steerer tube and/or away from the steering set, and/or away from the fork and/or wheel mount, however, in particular the locking mechanism also prevents movement in the opposite axial direction of the steerer tube.

This can be achieved, e.g., by increasing the outer diameter using the locking mechanism mounted on the steerer tube, such that it will not be possible to push the inner diameter of the clamp over the locking mechanism, even in the released position. In this case, the locking mechanism is mounted on the side of the stem facing away from the steering set and/or the fork, in particular on the end on the steerer tube, or the locking mechanism is arranged in a similar manner.

According to the invention, this is achieved by rear engagement of the locking mechanism through the stem and/or of the stem through the locking mechanism. For this purpose, the locking mechanism and/or the stem comprises, in particular, a securing element, e.g., in the form of a hook-shaped or mushroom-shaped extension, which is particularly adapted to grip behind and/or around the other component, and/or grip behind and/or around the other component, when mounted on the steerer tube. This gripping behind takes place, when the stem is mounted on the steerer tube, in particular in the clamped and released position, and/or in particular independent of the rotative position of the stem relative to the locking mechanism, i.e., at least all such rotative positions that are not prevented, when the stem set is mounted on the steerer tube.

In particular, the locking mechanism is annular and/or adapted to be suitable for enclosing the steerer tube. In particular, the locking mechanism is adapted to be clamped onto the steerer tube. For this purpose, it has, in particular, a locking mechanism assembly, which, in particular, cannot be released without tools and/or, in particular, is adapted to be rotated with a torque in the 4-20 Nm range, and thereby clamp the locking mechanism on the steerer tube. In particular, the locking mechanism is configured as a clamping clip. Preferably, the locking mechanism clamp is not a toggle clamp, wing nut, wing screw, thumbscrew, and/or tommy screw. Preferably, the locking mechanism clamp is a screw, an Allen screw with a pin or a Torx screw with a pin. In particular, the locking mechanism clamp and/or the locking mechanism is/are configured, such that the locking mechanism clamp and/or its screw head is countersunk in the locking mechanism in the clamped position of the locking mechanism. This further reduces the risk of theft and sabotage.

The locking mechanism is advantageously adapted, in particular while forming a form-fitting connection with the stem, to prevent the stem from being pulled off the steerer tube by limiting the movement of the stem along the steerer tube, wherein in particular the locking mechanism has at least one securing element in order to prevent the stem from being pulled off, and which grips behind or on the stem, in particular behind or on a locking element arranged on the stem, or the locking mechanism rests against the stem, particularly in a form-fitting manner, in order to prevent the stem from being pulled off.

Preferably, the locking mechanism and/or the stem has/have at least one first projection and/or at least one first recess for limiting the rotation of the stem on the steerer tube relative to the locking mechanism, when the stem set is mounted on the steerer tube. In particular, the direction of rotation is about the longitudinal axis of the fork shaft. In particular, the at least one first recess and/or the at least one first projection is/are configured and/or arranged, such that the limit, when being struck, defines a preset rotational position of the stem relative to the locking mechanism, wherein the at least one first projection and/or the at least one first recess, limits the rotation of the stem about the steerer tube to a rotational angle of less than 360°, when the clamping clip is in the released position, Thus, e.g., the straight-ahead riding position of the stem on the steerer tube may be given or defined by the preset rotational position. This makes it possible to reliably and easily find the straight-ahead riding position and subsequently fix it by clamping the stem's clamp. Limiting rotation prevents entanglement and/or damage to the lines and/or cables of brakes, gears, lights, and other handlebar-mounted devices.

Advantageously, the stem set is arranged, when the stem set is mounted on the steerer tube in the released position of the clamping clip, to allow for rotation of the stem about the steerer tube relative to the locking mechanism, in particular, in a first direction of rotation in the rotational position of the stem relative to the locking mechanism preset by the limitation, but to prevent this in a second direction of rotation opposite the first direction of rotation, in particular such that this will not be feasible without dismantling the stem set. In this way, it can be prevented, e.g., that a position rotated by 360° does not result in too little line or traction play being present for safe steering to occur.

In particular, the rotation is to be limited to an angular range of less than 350°, in particular less than 345°, in particular less than 340°. This makes it easy to detect that clamping is not in the preset position. Advantageously, a rotation of the stem about the steerer tube relative to the locking mechanism is thus limited to less than 360°, in particular less than 350°, in particular less than 345°, in particular less than 340°, such that a rotation of 360°, in particular less than 350°, in particular less than 345°, in particular less than 340°, is only possible after dismantling the stem set.

Particularly advantageously, the at least first recess and/or the at least first projection and/or the stem set, when mounted on the steerer tube in the released position of the clamping clip, allow for rotation of the stem about the steerer tube relative to the stem set of at least 10°, in particular at least 80°, in particular around the longitudinal axis of the fork stem, and/or in particular without having to actuate any further means and/or further unlocking, in particular from the preset rotational position into this and/or the position rotated 90° from the preset position, when the stem set is mounted on the steerer tube.

This allows for easy and/or single-handed transition of the stem from the straight-ahead riding position to the space-saving 90-degree rotated position of the handlebars and/or back.

In an alternative embodiment, which provides greater security against abandoning the straight-ahead riding position, but nevertheless allowing for easy and/or single-handed transfer to the straight-ahead riding position, the stem set has at least one locking element on the stem and/or the locking mechanism, wherein the locking element has a resetting element, which is adapted to allow for pretensioning the locking element in a first position and to allow for the locking element to be moved into a second position against a force exerted by the resetting element, wherein the stem set is adapted such that, in the released position of the at least one clamping clip, the locking element in the first position prevents rotation of the stem, when the stem set is mounted on the steerer tube relative to the locking mechanism in a first direction of rotation, in particular when moving the locking element into the second position due to the stem and locking mechanism parts rotating relative to one another, not restricted, but restricted in a second direction of rotation opposite the first direction of rotation, in particular fully prevented in the preset rotational position together with the at least one first recess and/or the at least one first projection, however, allowed after manually moving the locking element into the second position.

In the clamped position of the at least one clamping clip, the at least clamping means advantageously prevents rotation of the stem about the steerer tube at least up to a torque of 150 Nm applied to the stem and/or wherein, in the clamped position of the at least one clamping clip, the stem is frictionally connected to the steerer tube, wherein the torque required to rotate the stem about the steerer tube in the clamped position is at least 150 Nm.

Advantageously, the locking mechanism is adapted to surround the steerer tube and/or has a tensioning screw, in particular a direct or indirect tensioning screw, wherein the locking mechanism is adapted to be clamped to the steerer tube by means of the tensioning screw. In particular, the locking mechanism is adapted to be clamped on the steerer tube in order to prevent rotation about and translation along the steerer tube, at least when the torque is less than 150 Nm and/or the translational force is less than 250 N.

Advantageously, the locking mechanism is configured to be arranged and/or clamped on the steerer tube immediately below the stem, in particular between the stem and an upper bearing cone, and/or adapted to be arranged and/or clamped on the steerer tube above the stem, in particular between the stem and a first end of the steerer tube, wherein the first end is opposite a second end adjacent to a blade of the fork.

The problem is also solved by a vehicle with a, in particular, single one-piece, round steerer tube, in particular a bicycle, which has a stem set according to the invention mounted on the steerer tube. Thus, the stem set is configured and/or clamped to the steerer tube, in particular as described above as advantageous. In particular, the locking mechanism is clamped on the steerer tube. In particular, a handlebar is also attached to the stem.

BRIEF DESCRIPTION OF THE SEVERAL VIEWS OF THE DRAWINGS

The following purely schematic drawings and their description are intended to make it easier to understand the invention and do not restrict the invention. In the drawings:

FIG. 1b shows a section through the stem of the stem set shown in FIG. 1a; FIG. 1c shows a cross-section through a locking mechanism of the stem set shown in FIG. 1a;

FIG. 2b shows a cross-section through a locking mechanism of the stem set shown in FIG. 2a;

DETAILED DESCRIPTION

Figure 1A:
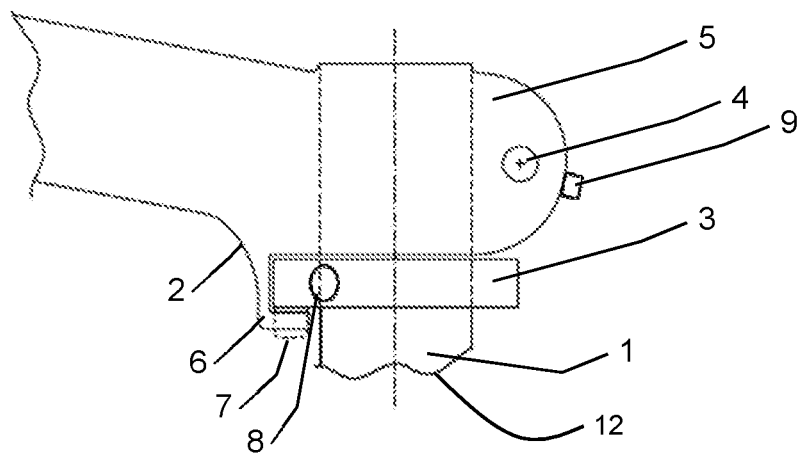
FIG. 1a shows a lateral view of a first embodiment of a stem set according to the invention, when mounted on a steerer tube.

FIG. 1a shows a lateral view of a first embodiment of a stem set according to the invention when mounted on a steerer tube 1. A ring-shaped locking mechanism 3 is clamped on the steerer tube 1. Above this, a stem 2 is arranged on the steerer tube 1. The steerer tube 1 is nevertheless also shown for illustrative purposes, in the area where the steerer tube 1 is enclosed and hidden by the stem set. The steerer tube 1 ends slightly above the end of the stem 2. A fork is located at the opposite end of the steerer tube 1, which is not shown here.

The stem 2 has clamping clips 5, with which the stem 2 can be releasably clamped on the steerer tube 1 with the aid of the clamping means 9, which is configured as a wing screw. The stem 2 further comprises a securing element 6, which is configured as hook-shaped and encloses a locking mechanism 3 (also referred to as a locking device), which is clamped on the steerer tube 1 below the stem 2. The locking mechanism 3 has a nose-shaped projection 7, which limits rotation of the stem 2 about the steerer tube 1 relative to the locking mechanism 3.

Figure 1B:
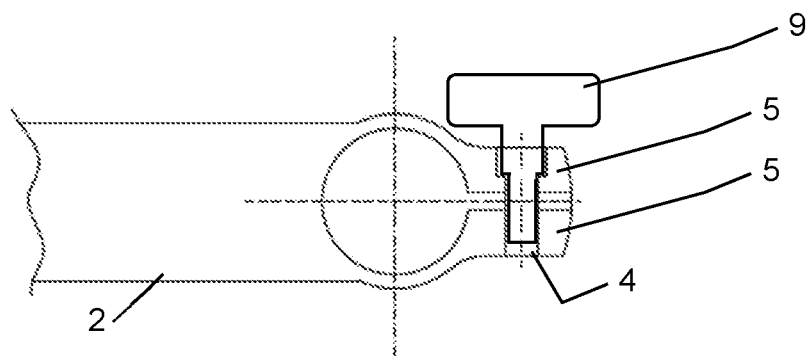

FIG. 1b shows a section through the stem 2 in FIG. 1a. Clearly visible here are the clamping clips 5, which can be moved toward one another with the wing screw 9 in order to clamp the stem 2 on the steerer tube 1 in a releasable manner. Visible is also that a thread 4 is provided on a clamping clip 5, into which thread 4, the wing screw 9 engages with the wing screw's thread. Visible is also that a through-hole was combined in the other clamping clip 5 with a larger blind hole allowing for a shoulder to be formed upon which, the wing screw 9 protruding into the blind hole is supported. This blind hole makes it possible to exchange the wing screw 9 for a screw with a simple head, which can then be countersunk in the blind hole. For example, an Allen screw may be used in this case. This enhances safety, especially against sabotage, however, requires the use of a tool for transitioning between the clamped and released position of the stem 2.

Figure 1C:
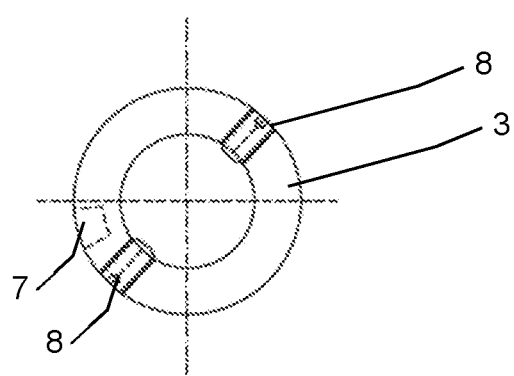

FIG. 1c represents a cross-section through the locking mechanism 3 in FIG. 1a. Two tensioning screws 8 can be seen here, by means of which the locking mechanism 3 may be clamped onto the steerer tube 1, as shown in FIG. 1a. The projection 7 arranged on the surface of the locking mechanism 3 is indicated by a dashed line.

In combination with FIGS. 1a, 1b, 1c, it can be seen that with the locking mechanism 3 clamped on the steerer tube 1 by means of the tensioning screws 8, and with the wing screw 9 loosened, the stem 2 can be rotated roughly 315° on the steerer tube 1, but cannot be removed from the steerer tube 1. Moreover, the stem 2 can be clamped in any of the allowed rotational positions on the steerer tube 1 by means of the wing screw 9, such that rotation around the steerer tube 1 is no longer possible. It is also apparent that if the locking mechanism 3 is appropriately aligned before the locking mechanism 3 is clamped on the steerer tube 1 by means of the tensioning screws 8, a certain position, in particular the straight-ahead riding position, can be defined by the projection 7 by turning the stem 2 until the stem 2 strikes the projection 7, and thereby determine this position. Thus, in order to assume the preset position, it is important that the projection 7 be struck from the preset direction.

Figure 2A:
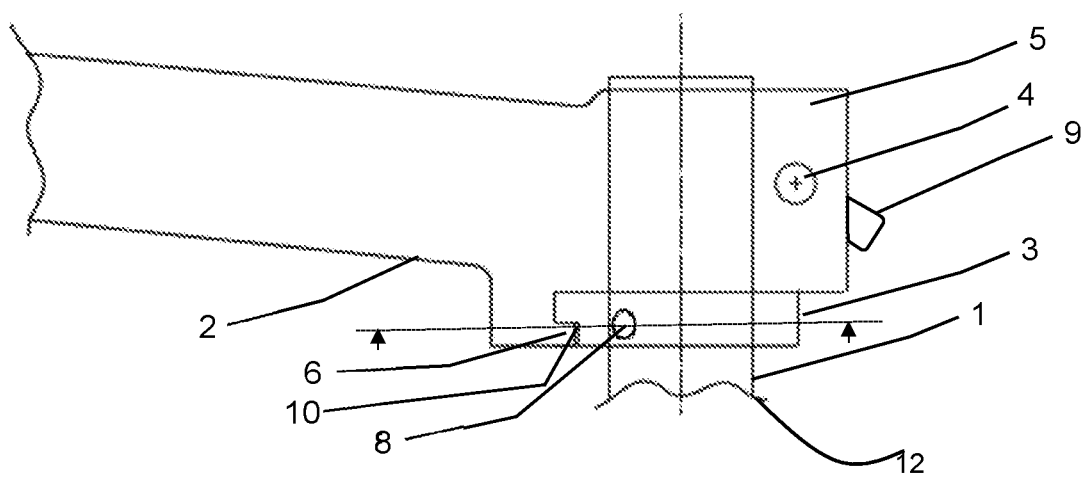
FIG. 2a shows a lateral view of a second embodiment of a stem set according to the invention, when mounted on a steerer tube.

FIG. 2a shows a view identical to FIG. 1a, however, of a second embodiment of a stem set mounted on a steerer tube 1. Here, the steerer tube 1 protrudes slightly upward above the stem 2. A fork is located at the opposite end of the steerer tube, not shown here. A ring-shaped locking mechanism 3 is clamped on the steerer tube 1. Above this, on the steerer tube 1, a stem 2 is arranged. The steerer tube 1 is nevertheless shown for illustrative purposes, including in the area where the steerer tube 1 is enclosed and hidden by the stem set.

The stem 2 has clamping clips 5, with which the stem can be releasably clamped on the steerer tube 1 with the aid of the clamping means 9, which is configured as a wing screw. The stem further has a securing element 6, which is configured as hook-shaped and encloses the locking mechanism 3 clamped on the steerer tube 1 below the stem 2.

Figure 2B:
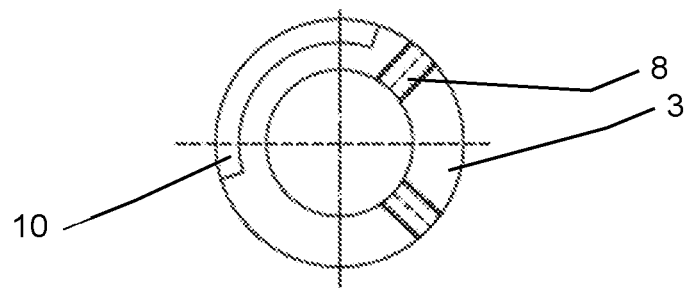

FIG. 2b shows a cross-section through the locking mechanism 3 of FIG. 2a, wherein the sectional plane in FIG. 2a extends just below the setback 10, wherein the top view in FIG. 2a is seen from below, as indicated there by corresponding arrows on the dashed line of intersection. This also shows the extension of the setback 10, which is guided over roughly 100° on the outer circumference. Two tensioning screws 8 are likewise shown, by means of which the locking mechanism 3 can be clamped onto the steerer tube 1, as shown in FIG. 2a.

As can be seen in FIG. 2a, a securing element 6 of the stem 2 extends in the setback 10, which is configured in the shape of a hook, and engages around the locking mechanism 3 clamped on the steerer tube 1 below the stem 2.

Given that the setback 10, in which the securing element 6 engages, is only configured over a limited angular range, the freedom of rotation of the stem 2 on the steerer tube 1 is limited with respect to the locking mechanism 3, in this case to approx. 90°. Depending on the mounting orientation of the locking mechanism 3 on the steerer tube 1, a stop thus provided can make the straight-ahead riding position safe and easy to find.

Figure 3:
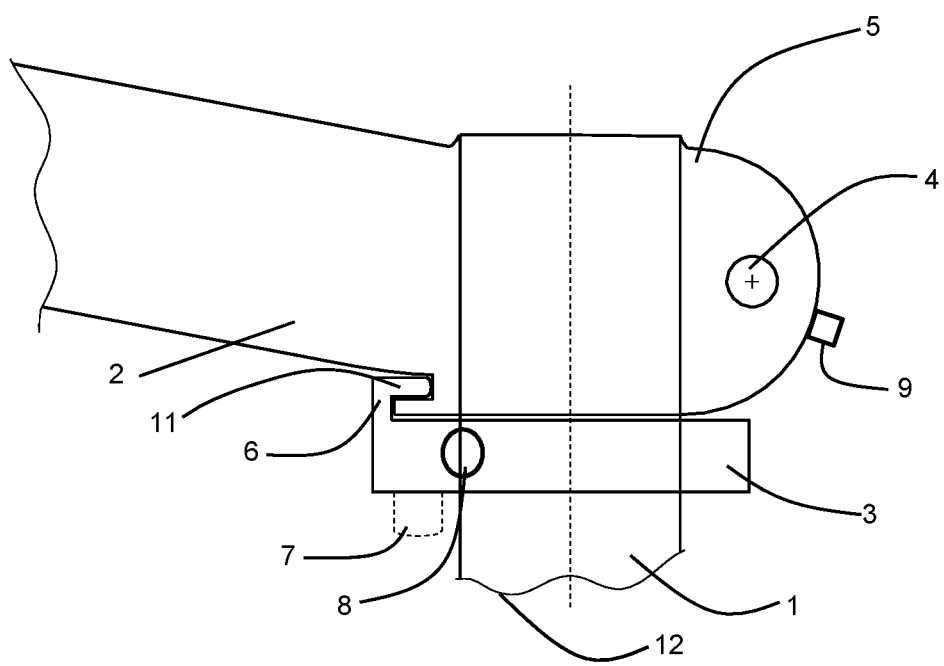
FIG. 3 shows a lateral view of a third embodiment of a stem set according to the invention, when mounted on a steerer tube.

FIG. 3 shows a lateral view of a third embodiment of a stem set according to the invention, when mounted on a steerer tube 1. A ring-shaped locking mechanism 3 is clamped on the steerer tube 1. Above this, a stem 2 is arranged on the steerer tube 1. The steerer tube 1 is nevertheless also shown for illustrative purposes, in the area where the steerer tube 1 is enclosed and hidden by the stem set. The steerer tube 1 ends slightly above the end of the stem 2. A fork is located at the opposite end of the steerer tube 1, which is not shown here.

The stem 2 has clamping clips 5, with which the stem 2 can be releasably clamped on the steerer tube 1 with the aid of the clamping means 9, which is configured as a wing screw. The stem 2 further comprises a securing element 6. A locking mechanism 3 is clamped on the steerer tube 1 below the stem 2. The locking mechanism 3 has a nose-shaped projection 7, which limits rotation of the stem 2 about the steerer tube 1 relative to the locking mechanism 3. The locking mechanism 3 further includes a securing member 11 which engages behind the stem 2, thereby preventing pull off of the stem from the steerer tube 1 by limiting the movement of the stem 2 along the steerer tube 1. The locking mechanism 3 is located between the stem 2 and the upper bearing cone 12.

Each of the figures shows a simple stem 2. However, the invention may also be used with more complex stems, e.g., those having a tilt and/or height adjustment.

REFERENCE NUMERAL LIST

1 Steerer tube
2 Stem
3 Locking mechanism
4 Thread
5 Clamping clip
6 Securing element
7 Projection
8 Tensioning screw
9 Clamping means
10 Setback
11 Securing member
12 Upper bearing cone

The invention claimed is:

1. A stem set for a bicycle with a round steerer tube, wherein the stem set comprises a stem with at least one releasable clamping clip adapted to enclose the steerer tube, and at least one clamping means for reversible and releasable clamping of the at least one clamping clip on the steerer tube;

wherein the at least one clamping clip is arranged such that, in a position in which the at least one clamping clip is clamped on the steerer tube by the at least one clamping means, rotation of the stem about the steerer tube is prevented and, in a released position, rotation of the stem about the steerer tube is not prevented;

wherein the at least one clamping means has a hand-grip section for manual movement, wherein the movement of the hand-grip section in a first direction or in a first direction of rotation causes reversible clamping of the at least one clamping clip on the steerer tube by way of the at least one clamping means;

wherein the movement of the hand-grip section in a second direction or in a second direction of rotation, causes reversible clamping release of the at least one clamping clip on the steerer tube, or is configured such that by way of the at least one clamping means, the at least one clamping clip is switchable from the clamped position to the released position or from the released position to the clamped position;

wherein the stem set has at least one locking device which is fixedly connectable to the steerer tube;

wherein the at least one locking device prevents the stem from being pulled off the steerer tube by limiting the movement of the stem along the steerer tube;

wherein the at least one locking device or the stem has at least one first projection or at least one first recess for limiting the rotation of the stem on the steerer tube relative to the at least one locking device when the stem set is mounted on the steerer tube;

wherein when the stem set is mounted on the steerer tube in the released position of the at least one clamping clip, the stem set is adapted to allow for rotation of the stem about the steerer tube relative to the at least one locking device in the first direction of rotation into a rotational position of the stem relative to the at least one locking device predetermined by the limit imposed by the at least one first projection or at least one first recess, but prevents rotation of the stem about the steerer tube relative to the at least one locking device in the second direction of rotation opposite the first direction of rotation without dismantling the stem set;

wherein the at least one first projection or the at least one first recess in the released position of the at least one clamping clip limits the rotation of the stem about the steerer tube to an angle of rotation of less than 360°;

wherein the at least one locking device has a securing member which extends around and interlockingly engages part of the stem preventing pull-off of the stem from the steerer tube; or wherein the stem has at least one securing element which extends around and interlockingly engages an end region of the at least one locking device preventing disengagement of the at least one locking device and thereby preventing the stem from being pulled off the steerer tube.

2. The stem set according to claim 1, wherein the at least one locking device or the stem has at least one first projection or at least one first recess for limiting the rotation of the stem on the steerer tube relative to the at least one locking device, when the stem set is mounted on the steerer tube; and wherein the at least one first projection or the at least one first recess in the released position of the at least one clamping clip limits the rotation of the stem about the steerer tube to the angle of rotation of less than 360°.

3. The stem set according to claim 2, wherein the at least one first recess or the at least one first projection is formed or arranged such that when contacted by the stem limits the rotation of the stem on the steerer tube and defines a predetermined rotational position of the stem relative to the at least one locking device.

4. The stem set according to claim 1, wherein the at least one first recess or the at least one first projection, when the stem set is mounted on the steerer tube in the released position of the at least one clamping clip, allows for rotation of the stem about the steerer tube relative to the at least one locking device of at least 10°, and limits rotation of the stem about the steerer tube relative to the at least one locking device to less than 360°, such that rotation by 360° is feasible only upon dismantling the stem set.

5. The stem set according to claim 1, wherein the at least one locking device is arranged on the steerer tube above the stem and is located between the stem and a first end of the steerer tube, and wherein the first end is opposite a second end closest to a blade of a fork.

6. A stem set for a bicycle with a round steerer tube, wherein the stem set comprises a stem with at least one releasable clamping clip adapted to enclose the steerer tube, and at least one clamping means for reversible and releasable clamping of the at least one clamping clip on the steerer tube;

wherein the at least one clamping clip is arranged such that, in a position in which the at least one clamping clip is clamped on the steerer tube by the at least one clamping means, rotation of the stem about the steerer tube is prevented and, in a released position, rotation of the stem about the steerer tube is not prevented;

wherein the at least one clamping means has a hand-grip section for manual movement, wherein the movement of the hand-grip section in a first direction or in a first direction of rotation causes reversible clamping of the at least one clamping clip on the steerer tube by way of the at least one clamping means;

wherein the movement of the hand-grip section in a second direction or in a second direction of rotation, causes reversible clamping release of the at least one clamping clip on the steerer tube, or is configured such that by way of the at least one clamping means, the at least one clamping clip is switchable from the clamped position to the released position or from the released position to the clamped position;

wherein the stem set has at least one locking device which is fixedly connectable to the steerer tube;

wherein the at least one locking device prevents the stem from being pulled off the steerer tube by limiting the movement of the stem along the steerer tube;

wherein the at least one locking device has a securing member which extends around and interlockingly engages part of the stem preventing pull-off of the stem from the steerer tube; or wherein the stem has at least one securing element which extends around and interlockingly engages an end region of the at least one locking device preventing disengagement of the at least one locking device and thereby preventing the stem from being pulled off the steerer tube; and wherein the securing member or the at least one securing element comprises a hook-shaped extension.

7. The stem set according to claim 6, wherein the hook-shaped extension of the at least one locking device grips behind and/or around the part of the stem with which the hook-shaped extension is engaged.

8. The stem set according to claim 6, wherein the hook-shaped extension of the stem grips behind and/or around the at least one locking device with which the hook-shaped extension is engaged.

9. The stem set according to claim 6, wherein the at least one locking device or the stem has at least one first projection or at least one first recess for limiting the rotation of the stem on the steerer tube relative to the at least one locking device, when the stem set is mounted on the steerer tube; and wherein the at least one first projection or the at least one first recess in the released position of the at least one clamping clip limits the rotation of the stem about the steerer tube to an angle of rotation of less than 360°.

10. The stem set according to claim 6, wherein the at least one locking device is arranged on the steerer tube above the stem and is located between the stem and a first end of the steerer tube, and wherein the first end is opposite a second end closest to a blade of a fork.

11. A stem set for a bicycle with a round steerer tube, wherein the stem set comprises a stem with at least one releasable clamping clip adapted to enclose the steerer tube, and at least one clamping means for reversible and releasable clamping of the at least one clamping clip on the steerer tube;

wherein the at least one clamping clip is arranged such that, in a position in which the at least one clamping clip is clamped on the steerer tube by the at least one clamping means, rotation of the stem about the steerer tube is prevented and, in a released position, rotation of the stem about the steerer tube is not prevented;

wherein the at least one clamping means has a hand-grip section for manual movement, wherein the movement of the hand-grip section in a first direction or in a first direction of rotation causes reversible clamping of the at least one clamping clip on the steerer tube by way of the at least one clamping means;

wherein the movement of the hand-grip section in a second direction or in a second direction of rotation, causes reversible clamping release of the at least one clamping clip on the steerer tube, or is configured such that by way of the at least one clamping means, the at least one clamping clip is switchable from the clamped position to the released position or from the released position to the clamped position;

wherein the stem set has at least one locking device which is fixedly connectable to the steerer tube;

wherein the at least one locking device is arranged on the steerer tube directly below the stem;

wherein the at least one locking device prevents the stem from being pulled off the steerer tube by limiting the movement of the stem along the steerer tube;

wherein the at least one locking device has a securing member which extends around and interlockingly engages part of the stem preventing pull-off of the stem from the steerer tube; or wherein the stem has at least one securing element which extends around and interlockingly engages an end region of the at least one locking device preventing disengagement of the at least one locking device and thereby preventing the stem from being pulled off the steerer tube; and wherein the at least one locking device is located between the stem and an upper bearing cone.

12. The stem set according to claim 11, wherein the stem set is arranged such that, in the released position of the at least one clamping clip, the at least one securing element in a first position does not restrict rotation of the stem, when the stem set is mounted on the steerer tube relative to the at least one locking device in the first direction of rotation, when moving the at least one securing element into a second position due to parts of the stem and the at least one locking device rotating relative to one another, but restricts rotation in the second direction of rotation opposite the first direction of rotation together with the at least one first recess or the at least one first projection, however, allows rotation after manually moving the at least one securing element into the second position.

13. The stem set according to claim 12, wherein the at least one locking member fully prevents rotation of the stem when the at least one locking member is in the second position.

14. The stem set according to claim 11, wherein, in the clamped position of the at least one clamping clip, the at least one clamping means prevents rotation of the stem about the steerer tube up to a torque of 150 Nm being applied to the stem or wherein, in the clamped position of the at least one clamping clip, the stem is non-positively connected to the steerer tube, wherein the required torque for rotating the stem around the steerer tube is at least 150 Nm.

15. The stem set according to claim 11, wherein the at least one locking device encloses the steerer tube or has a grub screw, wherein the at least one locking device clamps on the steerer tube by means of the grub screw, such that rotation about and translation along the steerer tube is prevented, at least at a torque of less than 150 Nm or a translational force of less than 250 N.

16. A bicycle with the round steerer tube having the stem set according to claim 11 mounted on the steerer tube.

17. The bicycle according to claim 16, wherein the round steerer tube is a one-piece steerer tube.

18. The stem set according to claim 11, wherein the round steerer tube is a one-piece steerer tube.

19. The stem set according to claim 11, wherein the movement of the hand-grip section is accomplished by a human hand and without the use of tools.

20. The stem set according to claim 11, wherein the at least one clamping means is one of a toggle clamp, a wing nut, a wing screw, a knurled screw and a tommy screw.

21. The stem set according to claim 11, wherein the at least one locking device is clamped to the steerer tube.

22. The stem set according to claim 11, wherein the at least one locking device or the stem has at least one first projection or at least one first recess for limiting the rotation of the stem on the steerer tube relative to the at least one locking device, when the stem set is mounted on the steerer tube; and wherein the at least one first projection or the at least one first recess in the released position of the at least one clamping clip limits the rotation of the stem about the steerer tube to an angle of rotation of less than 360°.

\* \* \* \* \*